United States Patent [19]

Takeuchi et al.

[11] Patent Number: 5,331,767
[45] Date of Patent: Jul. 26, 1994

[54] ENHANCED WEATHERSTRIP MOUNTED ON GLASS WITH OPPOSITE SIDE SEAL

[75] Inventors: Norio Takeuchi, Plymouth; Mark D. Faunce, Farmington Hills, both of Mich.

[73] Assignee: The Standard Products Company, Cleveland, Ohio

[21] Appl. No.: 36,628

[22] Filed: Mar. 24, 1993

[51] Int. Cl.⁵ .............................................. E06B 7/16
[52] U.S. Cl. .................................. 49/490.1; 49/475.1
[58] Field of Search ............... 49/475.1, 490.1, 495.1, 49/496.1, 502, 368; 296/146 R

[56] References Cited

U.S. PATENT DOCUMENTS

| | | | |
|---|---|---|---|
| 2,294,101 | 8/1942 | Tripp | 49/496.1 X |
| 2,379,193 | 6/1945 | Shields | 49/496.1 |
| 2,622,286 | 12/1952 | Beck | 49/496.1 |
| 3,363,364 | 1/1968 | Cadiou | 49/490.1 |
| 3,456,390 | 7/1969 | Hulverson et al. | 49/495.1 X |
| 4,348,046 | 9/1982 | Ohya | 49/502 X |
| 4,813,733 | 3/1989 | Gustafson et al. | 49/496.1 X |

*Primary Examiner*—Peter M. Cuomo
*Assistant Examiner*—Jerry Redman
*Attorney, Agent, or Firm*—Harness, Dickey & Pierce

[57] ABSTRACT

The present invention relates in general to weatherstrips for vehicle closures and more particularly to a weatherstrip for providing a seal between a first window glass panel and a second window glass panel. More particularly, a weatherstrip is provided and includes a resilient base portion having an extending member and two legs adapted to engage a second window glass panel and a resilient lip portion integral with and extending from the base portion toward a first window glass panel. The resilient lip portion is forked, having a sealing lip and a longer lip attached to the base of the sealing lip, wherein the longer lip has a bulbed end portion. The resilient lip portion is also self-biased with its resilience toward the second window glass panel so that it is sealingly engageable with the first window glass panel. When water pressure deflects the longer lip of the resilient lip portion, the bulb at the end thereof contacts the extending member of the base portion, creating a closed elongated area, ensuring that the sealing lip is deflected towards the longer lip, and preventing water leakage.

23 Claims, 1 Drawing Sheet

ENHANCED WEATHERSTRIP MOUNTED ON GLASS WITH OPPOSITE SIDE SEAL

TECHNICAL FIELD

The present invention relates in general to weatherstrips for vehicle closures and more particularly to a weatherstrip for providing a seal between the front and rear windows of the vehicle. Generally, the present invention is to be utilized between a front door window and a rear quarter window of a 2-door model or between a front door window and a rear door window of a 4-door model.

BACKGROUND OF THE INVENTION

In the past, weatherstrips useful for providing a sealing arrangement between the window glass panel of a vehicle's front door and the rear quarter window glass panel or rear door glass panel had a center sash cemented to the front end portion of a rear quarter window glass panel. The weatherstrip had a resilient strip fitted in the center sash and included a lip portion sealingly engageable with the rear end portion of the front door window glass panel.

The weatherstrip having a center sash has the following disadvantages. The interval between the front door window glass panel and the rear quarter window glass panel generally becomes large, resulting in deteriorated appearance. The center sash also needs to have a considerable width, which gives rise to a defective sealing arrangement between the upper end portion of the rear quarter window glass panel and a body side weatherstrip (not shown) mounted on a vehicle body roof side portion. This is due primarily to the considerable difference in thickness between the part having a center sash and the part which is not provided with a center sash. Furthermore, since the center sash tends to be exposed, the center sash must be coated to give it a more refined appearance. Typically, an expensive material such as stainless steel or plated sheet steel is utilized for the coating, thus resulting in an expensive cost and increasing the overall cost of the weatherstrip assembly.

In an attempt to overcome these problems, weatherstrips comprising a resilient L-shaped base portion located at one end having a rigid core member embedded therein and a resilient lip portion located at the other end have been developed. The resilient lip portion typically is substantially J-shaped in cross-section and forms a sealing point with the front door window glass panel. However, with this design, a large dimension of seal overlap is required between the resilient lip and the glass panel to limit leakage. This creates a clearance problem when the glass is in a storage position or when the glass panel travels to the storage position.

In an effort to prevent the large dimension of seal overlap and thus the traveling and storage clearance problems, the resilient lip portion of the weatherstrip is reduced in length. This, however, creates a water leakage problem along the sealing point when water pressure is exerted against the weatherstrip.

There thus remains a need for an improved weatherstrip. It is, therefore, an object of the present invention to overcome the disadvantages of heretofore known weatherstrips, and in particular, to provide a weatherstrip which is fully effective against leakage even under extreme conditions, such as heavy rainfall.

SUMMARY OF THE INVENTION

Accordingly, the present invention relates to a new and improved weatherstrip for providing a window sealing and guiding arrangement for supporting the edges of, and separating, two substantially parallel and aligned window panes.

In particular, a weatherstrip is provided which includes a resilient base having an extending member and two legs adapted to engage a rear quarter window glass panel or a rear door glass panel and a resilient lip portion integral with the base portion which extends toward a front door window glass panel. The resilient lip portion includes a first portion which extends from the base portion and a second portion which extends from the first lip portion at an angle. The second lip portion is branched and includes a sealing lip and a longer lip. According to a preferred embodiment the longer lip has a bulbed end portion. The resilient lip portion is self-biasing in the direction of the rear quarter window glass panel or the rear door glass panel depending on the vehicle upon which the weatherstrip is used. This self-biasing or resiliency in the direction of the rear quarter window glass panel or the rear door glass panel facilitates a sealing engagement of the lip against the front door window glass panel. When water pressure deflects the longer lip portion of the resilient lip, the bulb disposed at the end of the longer lip portion contacts an extending member of the base portion, creating a closed elongated area, thereby causing the sealing lip portion to be further deflected towards the longer lip portion to prevent water leakage. The sealing lip portion of the resilient lip seats against the front door window glass panel to form a sealing point along the front door window glass panel.

The primary advantage of the present invention is that an improved sealing arrangement is provided.

Another advantage of the present invention is that the weatherstrip is capable of withstanding relatively excessive water pressure to prevent leaking.

Yet another advantage of the present invention is that the resilient lip design does not cause the storage or traveling clearance problems associated with previously know weatherstrips.

Yet another advantage of the present invention is that the weatherstrip has a refined appearance.

Still another advantage is that the weatherstrip is relatively inexpensive both in terms of materials and manufacturing cost.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE INVENTION

Figure 1:
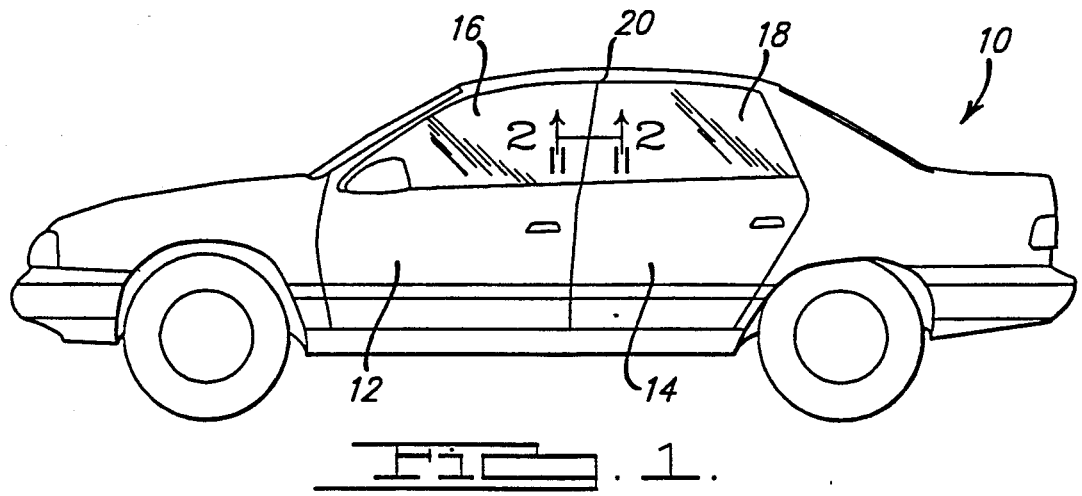
FIG. 1 is a side view of an automotive vehicle body incorporating the weatherstrip of the present invention.
Figure 2:
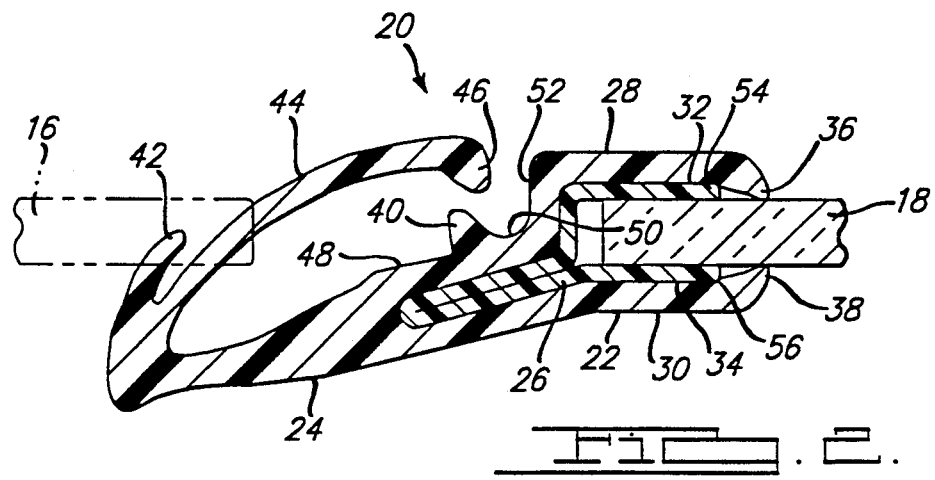
FIG. 2 is a cross-sectional view of the weatherstrip according to the teachings of the present invention taken along line 2—2 of FIG. 1.
Figure 3:
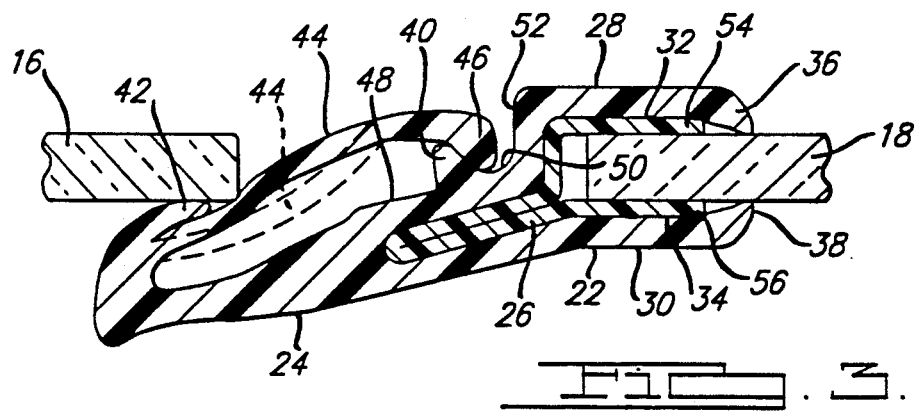
FIG. 3 is a cross-sectional view of the weatherstrip according to the teachings of the present invention also taken along line 2—2 of FIG. 1, wherein the weatherstrip is shown in a deflected position.

The automotive vehicle 10 shown in FIG. 1 has a front door 12, a rear door 14, front door window panel 16 and rear door window panel 18. The weatherstrip according to the teachings of the present invention is generally depicted in FIGS. 1, 2 and 3 at 20. While the invention is hereinafter generally described with reference to a four door vehicle having a rear door window glass panel it should be noted that such description is for convenience and that those skilled in the art will discern that the present invention is also useful for two door vehicles having a selectively displaceable rear quarter window glass panel.

The weatherstrip 20 according to the preferred embodiment of the present invention comprises a resilient base 22, a resilient lip shown generally at 24, and a substantially rigid core member 26. The base portion 22 has, with respect to a horizontal sectional plane, a substantially h-shaped section including two legs 28 and 30 adapted to be engaged at the inside surfaces 32 and 34 thereof by a rear window glass panel 18. Preferably, the legs 28 and 30 of the base portion 22 are provided with inwardly directed free ends 36 and 38, respectively, which engage the rear window glass panel 18. The base portion 22 also includes substantially triangular nub 40 which extends from the inner surface of the resilient lip portion 24. The inner surface 48 is also provided with a concaved recess 50 located between the nub 40 and the transversely disposed wall 52 of the base portion 22.

The resilient lip portion 24 is integral with and extends from the base portion 22 along wall 52 toward a front door window glass panel 16. The lip portion 24 is forked, having a sealing lip 42 slightly biased in the direction of the base portion 22 and a longer lip 44 extending from the bottom of the seal lip 42, more substantially biased in the direction of the base portion 22. The longer lip 44 is sufficiently long to extend from the sealing lip portion 42 to beyond the nub 40 when engaged by the front door window glass panel 16. The resilient lip portion 24 is self-biased with its resilience toward the rear door window glass panel 18 so that the sealing lip 42 is sealingly engageable with the inner surface of the front door window glass panel 16. The longer lip portion 44 is provided with a bulbed end portion 46 which is shaped to seat within the concaved recess 50 of the inner surface 48 upon full engagement by the front door window glass panel.

When water pressure deflects the longer lip 44 of the resilient lip portion 24, the bulbed end portion 46 contacts the substantially triangular shaped nub 40 of the base portion 22, creating a closed elongated area and deformed shape as shown in phantom in FIG. 3. By this engagement and resulting shape of the resilient lip portion 24, the sealing lip 42 is deflected towards the longer lip 44 to ensure a proper seal between the seal lip 42 and the front door window glass panel 16. The resulting shape of the resilient lip portion 24 also prevents water leakage.

A core member 26 is embedded within the base portion 22 and has, with respect to a horizontal sectional plane, a substantially h-shaped section having two legs 54 and 56 disposed contiguously against the interior surfaces 32 and 34, respectively, of the legs 28 and 30. The core member 26 also includes a stem 56 which extends from legs 52 and 54 into the resilient lip portion 24. This stem 56 extends at a slight angle to assist in aligning the resilient lip portion 24 such that the sealing lip 42 and longer lip 44 are properly biased. While the integral base and lip portions are generally formed from a resilient material such as rubber or a sufficiently flexible, soft synthetic resin, by conventional extrusion or injection molding methods, the core member 26 is typically formed from a substantially rigid material such as steel or hard plastic. The core member 26 typically becomes integrally inserted within the base portion 22 upon molding of the base portion 22 and the lip portion 24.

To prevent the separation of the core member 26 from the base portion 22, the core member 26 may be formed with one or more apertures (not shown) positioned along the stem 58 of the core member through which the resilient material flows and hardens to form posts (not shown) which preclude movement of the weatherstrip relative to the core member In a 2-door and a 4-door hardtop model, the legs 54 and 56 of the core member 26 are typically cemented or bonded to the surface portion of a rear quarter window glass panel by using an adhesive. Preferably, the adhesive will be the same color as the base and lip portions which are usually black.

To install the weatherstrip 20 of the present invention the legs 28 and 30 of the base portion 22 are pushed over the glass panels edge such that the legs 54 and 56 of the core member are contiguously positioned against the window. In a 2-door hardtop model, an adhesive is first applied to either of the inside surfaces of the legs 54 and 56 or the surface portions located along the edge of a rear quarter window glass panel, or to both, prior to attaching the weatherstrip to the rear quarter window glass panel. The weatherstrip 20 is then positioned on the rear quarter window glass panel 18 along a first end by pushing the legs 54 and 56 over the glass panel's edge.

During installation of the weatherstrip 20 to the rear quarter window glass panel of the 2-door hardtop model or the rear door window glass panel of the 4-door hardtop model, it is important to take care that a minimal number of air holes are produced between the base portion 22 and a rear quarter window glass panel. Any such air holes would likely result in an undesirable spotty appearance, inevitably detracting from the aesthetic appearance of the vehicle. The core member 26 is designed to assist in the prevention of air holes during the installation process. The rigidity of the weatherstrip 20 precludes flexing of the base portion 22 which makes it quite easy to push the base portion 22 uniformly against the glass panel 18. By pushing the base portion 22 evenly and uniformly onto the glass panel 18, the air holes can be substantially eliminated.

While the present invention has been specifically described with reference to two and four door hardtop model vehicles, it will be appreciated by those skilled in the art that the weatherstrip 20 of the present invention is equally applicable to two and four door softtop model vehicles as well.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A weatherstrip for providing a seal between first and second selectively movable window glass panels, comprising:
   a resilient base portion having first and second spaced apart legs having incurved end portions, whereby said incurved end portions tightly engage said first glass panel;
   a resilient lip portion integral with and extending from said base portion, said resilient lip including a branched sealing lip portion which extends substantially perpendicularly from the resilient lip and a longer lip portion which extends in the direction of said base portion; and
   a substantially rigid core member at least partially embedded in said base portion having a portion which at least partially extends into said resilient lip portion.

2. The weatherstrip as set forth in claim 1, wherein said the resilient lip is provided with a recess located between an extending nub and said base portion.

3. The weatherstrip as set forth in claim 1, wherein said resilient lip is biased in the direction of said second window.

4. The weatherstrip as set forth in claim 1, wherein the longer lip includes a bulbed end portion.

5. The weatherstrip as set forth in claim 4, wherein the longer lip engages said extending nub such that the bulbed end portion of the longer lip engages the recess of said resilient lip upon positioning said first glass panel against the resilient lip.

6. The weatherstrip as set forth in claim 1, wherein said longer lip portion extends from said sealing lip.

7. The weatherstrip as set forth in claim 1, wherein the base portion and resilient lip portion are formed of rubber.

8. The weatherstrip as set forth in claim 1, wherein the core member is formed of steel.

9. A weatherstrip for providing a seal between a first and second selectively movable window glass panels, comprising:
   a resilient base portion having first and second spaced apart legs adapted to engage the edge of a first window glass panel;
   a resilient lip portion integral with and extending from said base portion toward said first window glass panel, said resilient lip portion including a sealing lip which extends substantially perpendicularly from the resilient lip and a longer lip which extends from the sealing lip in the direction of the base portion, wherein the sealing lip forms a sealing point with said first window glass panel; and
   a substantially rigid core member at least partially embedded in said base portion and partially extending into said resilient lip portion, said core member including two spaced apart legs disposed substantially parallel to the legs of said base portion and a stem extending into said resilient lip portion.

10. The weatherstrip as set forth in claim 9, wherein the longer lip includes a bulbed end portion.

11. The weatherstrip as set forth in claim 10, wherein said resilient lip portion includes a nub extending in the direction of said longer lip and a recess located between said nub and said base portion;
   whereby said recess hosts the bulbed end of said longer lip upon positioning said first glass panel against the resilient lip.

12. The weatherstrip as set forth in claim 9, wherein said resilient lip is biased in the direction of said second window.

13. The weatherstrip as set forth in claim 9, wherein said legs of said base portion include incurved ends which engage different surfaces of said second window glass panel.

14. The weatherstrip as set forth in claim 9, wherein said longer lip extends from said sealing lip.

15. The weatherstrip as set forth in claim 9, wherein the base portion and resilient lip portion are formed of rubber.

16. The weatherstrip as set forth in claim 9, wherein the core member is formed of steel.

17. A window sealing and guiding arrangement for providing a seal between first and second movable window glass panels of an automotive vehicle, comprising:
   a resilient base portion having first and second spaced apart legs adapted to engage a first window glass panel;
   a resilient lip portion integral with and extending from said base portion in the direction of said first window glass panel, said resilient lip being self-biased with its resilience toward said second window glass panel, wherein the resilient lip portion is forked to include a sealing lip which extends substantially perpendicularly from the resilient lip and a longer lip which extends in the direction of the base portion, said sealing lip providing a sealing point when disposed against said first window glass panel; and
   a substantially rigid core member at least partially embedded in said base portion and being of a substantially h-shaped section having two legs disposed substantially parallel to the legs of said base portion and a stem extending at least partially into said resilient lip portion, whereby the legs of said base portion engage the edge of said second window glass panel.

18. A weatherstrip as set forth in claim 17, wherein said legs of said base portion include incurved ends which engage said second window glass panel.

19. The weatherstrip as set forth in claim 17, wherein the resilient lip includes a nub extending in the direction said longer lip portion and a recess located on the inner surface of said resilient lip between said nub and the base portion, whereby the end of said longer lip is adapted to be received within said recess.

20. The weatherstrip as set forth in claim 19, wherein the longer lip portion of said resilient lip is provided with a bulbed end.

21. The weatherstrip as set forth in claim 17, wherein said longer lip extends from said sealing lip.

22. The weatherstrip of claim 17, wherein the base portion and resilient lip portion are formed of rubber.

23. The weatherstrip of claim 17, wherein the core member is formed of steel.

* * * * *